United States Patent [19]

Rourke et al.

[11] Patent Number: 4,556,203

[45] Date of Patent: Dec. 3, 1985

[54] REMOTE CENTER COMPLIANCE DEVICE

[75] Inventors: Jonathan M. Rourke, Cambridge; Daniel E. Whitney, Arlington, both of Mass.

[73] Assignee: The Charles Stark Draper Laboratory, Inc., Cambridge, Mass.

[21] Appl. No.: 568,357

[22] Filed: Jan. 5, 1984

[51] Int. Cl.[4] .................................................. F16F 3/08
[52] U.S. Cl. ................................. 267/141.1; 267/153
[58] Field of Search .............. 267/63 R, 140.2, 140.5, 267/141, 141.2, 141.3, 141.4, 153; 188/268

[56] References Cited

U.S. PATENT DOCUMENTS

| | | | |
|---|---|---|---|
| 1,772,414 | 8/1930 | Brooke-Hunt et al. | 267/141.1 X |
| 2,639,140 | 5/1953 | Frenkel | 267/140.2 |
| 2,729,443 | 1/1956 | Olinger | 267/141.1 X |
| 2,911,207 | 11/1959 | Coble et al. | 267/141.1 X |
| 2,987,291 | 6/1961 | Dyson | 267/153 X |

Primary Examiner—Duane A. Reger
Attorney, Agent, or Firm—Joseph S. Iandiorio; William E. Noonan

[57] ABSTRACT

An improved remote center compliance device is disclosed including: a first support member and a second support member spaced from the first support member. There is a first set of at least three shear pad flexures interconnecting the support members and disposed along conical radii from a first center. An operator member extends from the first support member and the flexures are prestressed into compression in the rest condition or arranged in juxtaposition to another set of flexures, so that in operation there are flexures in compression and flexures in tension.

15 Claims, 7 Drawing Figures

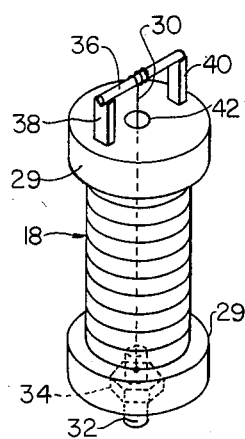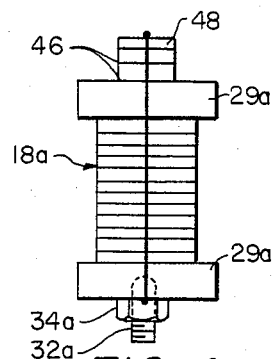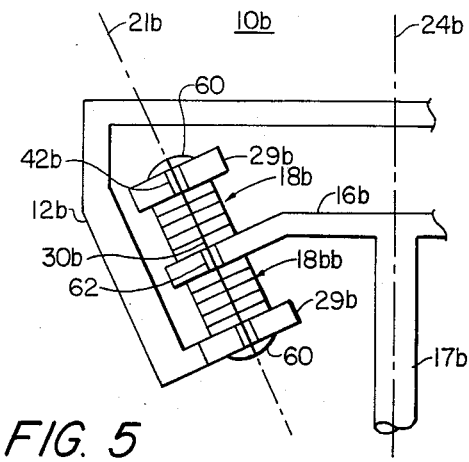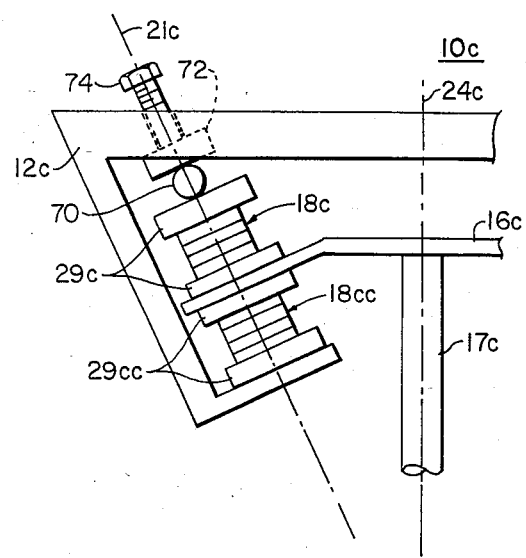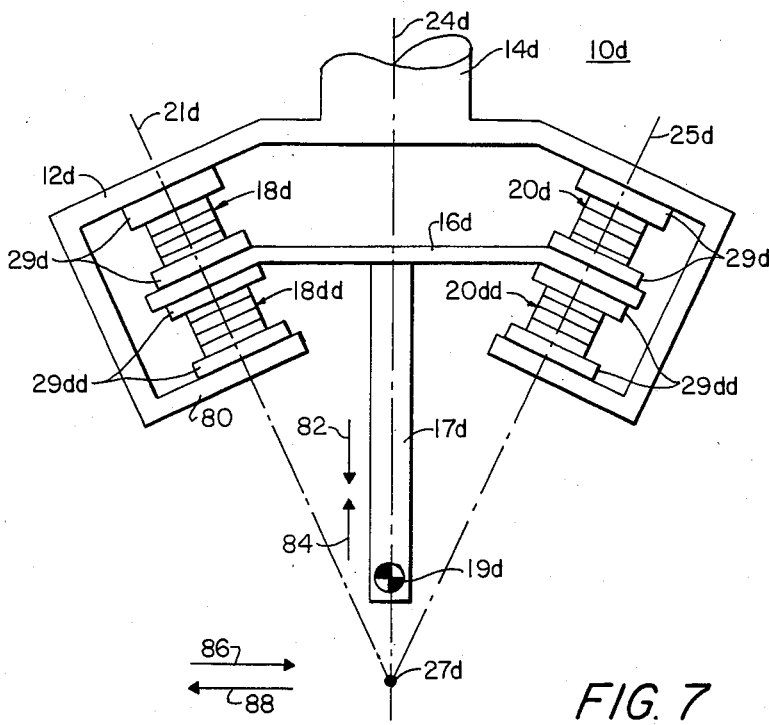

REMOTE CENTER COMPLIANCE DEVICE

FIELD OF INVENTION

This invention relates to an improved remote center compliance device in which the shear pad flexures are prestressed into compression or arranged in juxtaposition to another set of flexures, so that in operation there are flexures in compression and flexures in tension.

BACKGROUND OF INVENTION

Conventional remote center compliance devices use a set of at least three shear pads, or two sets of at least three pads each, to provide rotational and translational compliance and are then arranged so that a dead load places them all in tension. It was assumed in the past that each pad's compression/tension stiffness was much greater than its shear stiffness, and that the stiffness ratio, compression axial stiffness or tension axial stiffness compared to shear stiffness, remained the same throughout normal use. Remote center compliance devices were generally not regarded as being in tension, or tension was not recognized as a source of problems.

However, in such remote center compliance devices using three and six shear pad flexure units, the center of compliance was always much closer to the device than desired and predicted analytically. Further, in use under normal lateral deflection, the remote center would move even more dramatically closer.

In addition, such remote center compliance devices were suffering breakage of their shear pads even though the dead load on them did not exceed their rated loading.

SUMMARY OF INVENTION

It is therefore an object of this invention to provide a remote center compliance device with improved linearity and uniformity of its compliant response, whose stiffness and compliance center location do not change during normal lateral deflection.

It is a further object of this invention to provide such a remote center compliance device with greater projection distance of the remote center for a given RCC size and stiffness.

It is a further object of this invention to provide such a remote center compliance device whose compliant response and remote center is more predictable analytically.

It is a further object of this invention to provide such a remote center compliance device which is able to operate with much greater loads and absorb much greater lateral error without pad breakage.

The invention results from the realization that the shear pads in a remote center compliance device underwent tension as well as compression, and that the ratio of compression axial stiffness and tension axial stiffness to shear stiffness decreased dramatically as the pad underwent more and more tension in some pads in response to lateral displacements, which resulted in a softening of the remote center compliance device and a shifting closer to the remote center compliance device of the remote center, and that this softening and shifting could be overcome by providing means to ensure that the pads operate only in the compression range.

This invention features a remote center compliance device having a first support member, a second support member spaced from the first support member, and a first set of at least three shear pad flexure means interconnecting the support members and disposed along conical radii from a first center. An operator member extends from the first support member and there are means for prestressing the flexure means into compression in the rest condition.

In a preferred embodiment the means for prestressing maintains the flexures in compression in the operation range, as well as the rest condition of the remote center compliance device. The means for prestressing may include a third support member fixed relative to the second member and a second set of at least three shear pad flexure means interconnecting the third support member and the first member from which the operator member extends. The second set of flexure means are also disposed along conical radii from the center.

The means for prestressing may alternatively include a wire longitudinally disposed in a hole through the flexure means and fastened under tension at each end of the flexure means to compress the flexure means. The flexure means may include on at least one end a bridge beam for securing one end of the wire.

Alternatively, the means for prestressing may include a second set of at least three shear pad flexure means disposed along conical radii from the first center and paired in alignment with corresponding ones of the flexures of the first set. Each of the flexure means in the second set includes an end member for securing one end of a tension element which passes through a central hole in the corresponding flexure elements in the first and second sets and is secured through the second support member for compressing the shear pad flexures. Alternatively, each of the second flexure means in the second set may include means for compressing the pairs of flexure means. In another construction, the means for compressing may include a pre-loading screw and there may be a ball bearing which is borne on by the screw and which bears on the one of the pair of flexures in the second set.

The invention also features a remote center compliance device including first and second spaced support means and third support means disposed between and spaced from the first and second support means. An operator means extends from the third support means. There is a first set of at least three shear pad flexure means interconnecting the first and third support means and a second corresponding set of at least three shear pad flexure means interconnecting the second and third support means, for establishing compressive stress in some of the shear pads and tensile stress in others in response to a force or moment on the operator member.

The flexure means in the second set of at least three shear pad flexure means may be paired in alignment with corresponding ones of the flexure means in the first set.

DISCLOSURE OF PREFERRED EMBODIMENT

Other objects, features and advantages will occur from the following description of a preferred embodiment and the acompanying drawings, in which:

FIG. 3 is a more detailed illustration of one of the compressed flexures of FIG. 1;

FIG. 4 is an elevational view showing a flexure according to FIG. 1, with an alternative means for compressing the flexure;

FIG. 5 is a broken away view of a portion of a remote center compliance device showing one of a number of two-part flexure means in compression employed in the remote center compliance device according to this invention;

FIG. 6 is a schematic view similar to FIG. 4 showing an alternative means for compressing the two-part flexure means; and FIG. 7 is a schematic diagram showing an alternative remote center compliance device with two-part flexures to produce compression.

Figure 1:
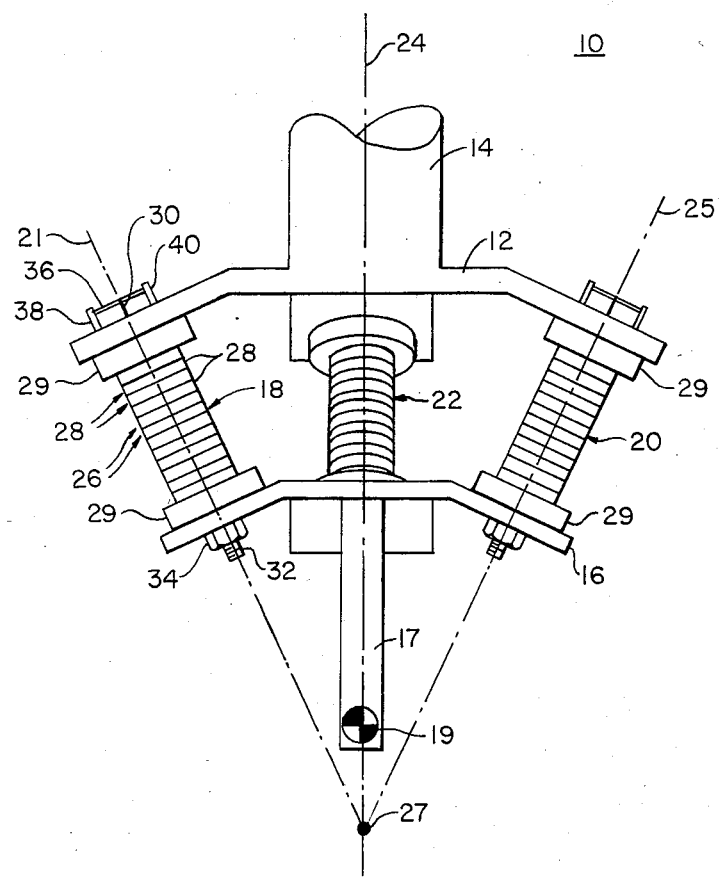
FIG. 1 is a schematic elevational view of the improved remote center compliance device with compressed flexures according to this invention.

The invention may be accomplished with a remote center compliance device having first and second support members spaced from one another with a first set of at least three shear pads interconnecting the support members and disposed along conical radii from a first center. The shear pads typically may be one inch long, 0.5 inch in diameter, and be made up of twenty laminations of 0.020 inch thick rubber sheets and 0.010 inch thick steel shims. An operator member extends from the first support member and there are means for prestressing the shear pads into compression in the rest condition so that in the rest position the device has a stress of one to ten pounds per square inch in the shear pads. The compression stress is preferably maintained throughout the operating range of the device which may extend from ten pounds per square inch to seventy pounds per square inch compression. These quantities are illustrative for typical small commercially available shear pads and may vary with different shear pad types and RCC design objectives.

The means for prestressing may include a tension element such as a steel wire of 0.03 inch diameter, longitudinally extending through a hole in the shear pads and fastened at each end of the shear pads to produce a tension in the wire of approximately ten to twenty pounds. On at least one end, the wire may be attached to a bridge beam of steel material and 0.05 to 0.10 inch diameter held by supports spaced apart by 0.5 inch so that the flexibility of the beam enters into the overall compliance of the remote center compliance device.

The means for prestressing may alternatively include a second set of at least three shear pads disposed along conical radii from the first center and paired in alignment with corresponding ones of the shear pads in the first set so that no matter in which longitudinal direction the operator member is moved, the shear pads of one of the sets will be in compression. In an alternative construction, each of the flexure means of the second set may include an end member for securing one end of a tension element which passes through a hole in the corresponding shear pads in the first and second sets and is secured to the second support member for compressing the shear pads. In another alternative, each of the shear pads in the second set may include means for compressing the pairs of shear pads. That means for compressing may include a pre-loading screw and there may be a ball bearing which is borne on by the screw and which, in turn, bears on the one of the pair of shear pads which is in the second set. The ball bearing may be of conventional design, approximately 0.25 to 0.5 inch in diameter, cooperating with races of any convenient radius larger than the ball's radius, one on the top of the associated shear pads and one on the bottom of a preloading screw which can be rotated to increase or decrease the pressure on the shear pad through the ball bearing.

Alternatively, the invention may be accomplished with a remote center compliance device including first and second spaced support means and third support means disposed between and spaced from the first and second support means. There is and operator member extending from the third support means. There is a first set of at least three shear pad flexure means which are disposed along conical radii from a first center, which interconnect the first and third support means. A second corresponding set of at least three shear pad flexure means is disposed along the same conical radii from that center and inteconnect the second and third support means, for establishing compressive stress in some of the shear pads and tensile stress in others in response to a force or moment on the operator member. The second set of at least three shear pad flexure means may be paired in alignment with the corresponding flexure means in the first set.

There is shown in FIG. 1 an improved remote center compliance device 10 according to this invention, including a first upper support member 12 which is fastened to a robot arm or other machine by means of section 14. A second support member 16, suspended from which is operator member 17 having a remote center of compliance 19 at, near or beyond its end, is interconnected with support member 12 by means of three flexures, shear pads 18, 20 and 22, not shown. Typically, pads 18, 10 and 22 are disposed uniformly 120° apart in a circle about the central axis 24 of device 10 and along radii 21, 23 (not shown), and 25, from a center 27. Each shear pad is made up of alternate layers of rubber 26 and metal 28 shims, and has upper and lower end pieces 29. Each of the shear pads is placed in compressive stress by means of a tension element such as wire 30 attached at one end to anchor bolt 32 held in position by nut 34, and at the other end to bridge beam 36 mounted in posts 38 and 40.

Figure 2:
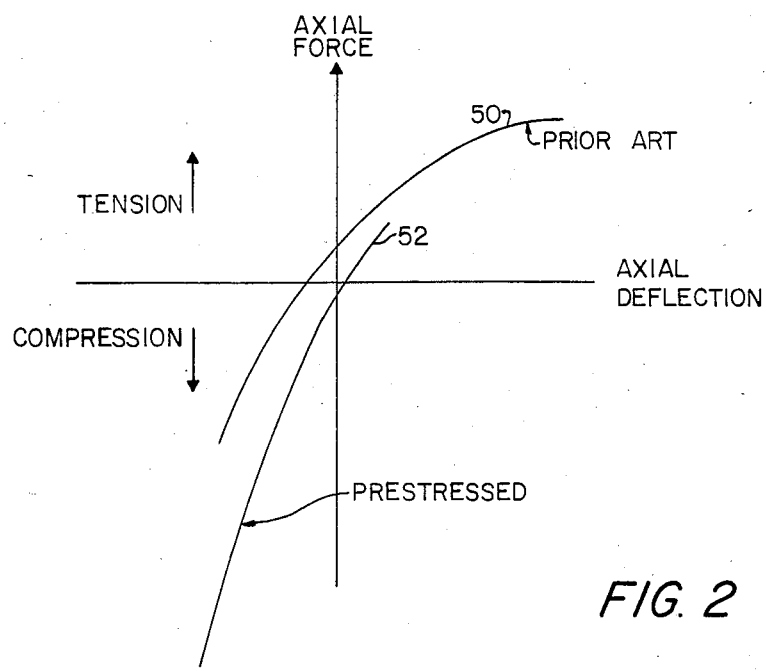
FIG. 2 shows characteristic force-deflection curves for the shear pads of conventional remote center compliance devices and the shear pads of remote center compliance devices according to this invention.

As a result of the imposed compressive stress, the characteristic of device 10 shifts from the prior art condition as shown by curve 50 to the pre-stress condition 52, FIG. 2. Each pad operates in the compressed state of curve 52, where it is both stiffer and more linear. This provides a more uniform stiffness characteristic when compressive or tensile loads are applied to the shear pad. This ensures good center projection by providing the pads with a high ratio of compression stiffness to shear stiffness. It also produces desirably low lateral stiffness at the compliance center through the availability of the low shear stiffness. The great reduction in stiffness that occurs along curve 50 when pads in a normal RCC are placed in tension does not occur in RCC's made according to this invention. This reduction causes the remote center to move dramatically toward the RCC, an undesirable effect. This effect does not occur or occurs only slightly in RCC's made according to this invention.

Shear pad 18, FIG. 1, is shown in greater detail in FIG. 3, where wire 30 can be seen to pass directly longitudinally through pad 18 through hole 42 in shear pad 18. Alternatively, wire 30a, FIG. 4, may be tensioned by a stack of slotted washers 46 beneath end plate 48.

The invention may also take a form in which there are two sets of shear pads arranged in aligned pairs, or the aligned pairs may be viewed as a single pad split in the middle with its two halves maintained in longitudinal alignment. Such a construction is shown in FIG. 5 where a tension rod or wire 30b extends from anchor cap 60 through hole 42b and end caps 29b, and shear pads 18b and 18bb as well as through hole 62 in support member 16b.

Instead of a tension rod, compressive stress may be imposed on shear pads 18c, 18cc, FIG. 6, by a ball bearing 70 which rests on upper end piece 29c and is pressed downward by raised piece 72 under pressure from a pre-loading screw 74 threadably engaged with support member 12c.

In another form, which does not require prestressing, the remote center compliance device 10d, FIG. 7, may include two sets of at least three shear pads, the first set including shear pads 18d, 20d and 22d (not shown) and the second set including shear pads 18dd, 20dd and 22dd (not shown). The first set is disposed between member 16d and the upper portion of support member 12d, while the second set is disposed between member 16d and the lower portion 80 fixed to member 12d. The pads of the second set are aligned along the same conical radii 21d, 23d (not shown) and 25d from the center 27d. At least some of the shear pads in one of the sets are in compression, while at least some of the pads in the other set are in tension when a force or moment is applied to the operator member. When the force on operator member 17d is in the direction of arrow 82, shear pads 18dd, 20dd and 22dd, not shown, are in compression. When the force on operator member 17d is in the opposite direction as shown by arrow 84, then the upper set consisting of shear pads 18d, 20d and 22d, not shown, is in compression. Since the compression stiffness of each pad far exceeds the tension stiffness, each pair of pads (say 18d and 18dd) will have a combined axial stiffness which is numerically equal to or similar to the compressive stiffness of one pad regardless of whether the force is in the direction 82 or 84. In addition, due to the push-pull nature of the design, the bulk of the nonlinearity in curve 50 is cancelled out and the pair is approximately a linear compression-tension spring. Alternatively, if a lateral force in the direction of arrow 86 is applied to the operator member 17d, pads 18dd and 20d will be in compression while 18d and 20dd will be in tension. Again, because one of each pair is in compression, the result is as if an almost linear compression-tension spring replaced each axially aligned pair. When the lateral force is in the opposite direction (arrow 86), their roles are reversed and 18dd and 20d are in tension while 18d and 20dd are in compression. Again, one of each axially aligned pair is in compression and approximately linear behavior is obtained.

The result overall with the device of FIGS. 5 and 6, as well as FIG. 7, is an RCC with much more uniform properties in all directions than a conventional RCC. Its compliance center will not move toward the RCC when lateral loads (perpendicular to axis 24) are applied, as occurs with conventional shear pad RCC's. Finally, an RCC according to this invention is just as strong in tension as it is in compression (applied load along arrow 84). This prevents tension breakage of the shear pads.

Other embodiments will occur to those skilled in the art and are within the following claims:

What is claimed is:

1. A remote center compliance device comprising:
a first support member;
a second support member spaced from said first support member;
a first set of at least three shear pad flexure means interconnecting said support members and disposed along conical radii from a first center;
an operator member extending from said first support member; and
means for prestressing said flexure means into compression.

2. The remote center compliance device of claim 1 in which said means for prestressing maintains said flexures in compression throughout the operation range of the device.

3. The remote center compliance device of claim 1 in which said means for prestressing includes a third support member fixed relative to said second support member and a second set of at least three shear pad flexure means interconnecting said third support member and said first member from which said operator member extends.

4. The remote center compliance device of claim 3 in which said second set of flexure means are disposed along conical radii from said first center.

5. The remote center compliance device of claim 1 in which said means for prestressing includes a wire longitudinally disposed in a hole through said flexure means and fastened under tension at each end of said flexure means to compress said flexure means.

6. The remote center compliance device of claim 5 in which said flexure means includes on at least one end a bridge beam for securing one end of said wire.

7. The remote center compliance device of claim 1 in which said means for prestressing includes a second set of at least three shear pad flexure means, disposed along conical radii from said first center and paired in alignment with corresponding ones of said flexure means in said first set, each of said flexure means in said second set including an end member for securing one end of a tension element which passes through a hole in the corresponding flexure elements in the first and second sets and is secured to said second support member for compressing said shear pad flexures.

8. The remote center compliance device of claim 1 in which said means for prestressing includes a second set of at least three shear pad flexure means disposed along conical radii from said first center and paired in alignment with corresponding ones of said flexure means in said first set, each of said flexure means in said second set including means for compressing said pairs of flexure means.

9. The remote center compliance device of claim 8 in which said means for compressing includes a preloading screw.

10. The remote center compliance device of claim 9 in which said means for compressing further includes a ball bearing borne on by said screw and, in turn, bearing on one of said pair of flexures in said second set.

11. A remote center compliance device comprising:
first and second spaced support means;
third support means disposed between and spaced from said first and second support means;
an operator member extending from said third support means; and
a first set of at least three shear pad flexure means disposed along conical radii from a first center and attached to said first and third support means, and a second corresponding set of at least three shear pad flexure means disposed along conical radii from said first center and attached to said second and third support means, for establishing compressive stress in some of the shear pads and tensile stress in others in response to a force or moment on said operator member.

12. The remote center compliance device of claim 11 in which said flexure means in said second set of at least three shear pad flexure means are paired in alignment with corresponding ones of said flexure means in said first set.

13. A remote center compliance device comprising:
a first support member;
a second support member spaced from said first support member;
a first set of at least three shear pad flexure means interconnecting said support members and disposed along conical radii from a first center;
an operator member extending from said first support member; and
means for prestressing said flexure means into compression including a wire longitudinally disposed in a hole through said flexure means and fastened under tension at each end of said flexure means to compress said flexure means.

14. The remote center compliance device of claim 13 in which said flexure means includes on at least one end a bridge beam for securing one end of said wire.

15. A remote center compliance device comprising:
a first support member;
a second support member spaced from said first support member;
a first set of at least three shear pad flexure means interconnecting said support members and disposed along conical radii from a first center;
an operator member extending from said first support member; and
means for prestressing said flexure means into compression including a second set of at least three shear pad flexure means, disposed along conical radii from said first center and paired in alignment with corresponding ones of said flexure means in said first set, each of said flexure means in said second set including an end member for securing one end of a tension element which passes through a hole in the corresponding flexure elements in the first and second sets and is secured to said second support member for compressing said shear pad flexures.

* * * * *